(12) United States Patent
Szu

(10) Patent No.: US 9,349,027 B2
(45) Date of Patent: May 24, 2016

(54) SMART HYBRID CARD SYSTEM PROVIDING AUTHENTICITY, PRIVACY, AND SECURITY (APS)

(71) Applicant: Harold Szu, Bethesda, MD (US)

(72) Inventor: Harold Szu, Bethesda, MD (US)

( * ) Notice: Subject to any disclaimer, the term of this patent is extended or adjusted under 35 U.S.C. 154(b) by 562 days.

(21) Appl. No.: 13/753,060

(22) Filed: Jan. 29, 2013

(65) Prior Publication Data

US 2013/0206837 A1    Aug. 15, 2013

Related U.S. Application Data

(63) Continuation-in-part of application No. 12/041,357, filed on Mar. 3, 2008, now Pat. No. 8,360,315.

(60) Provisional application No. 60/892,648, filed on Mar. 2, 2007.

(51) Int. Cl.
| | | |
|---|---|---|
| *G06F 19/00* | (2011.01) | |
| *G06K 19/06* | (2006.01) | |
| *G06K 7/00* | (2006.01) | |
| *G06K 19/08* | (2006.01) | |
| *G06K 7/10* | (2006.01) | |

(52) U.S. Cl.
CPC .......... *G06K 7/0004* (2013.01); *G06K 7/10257* (2013.01); *G06K 7/10297* (2013.01); *G06K 19/08* (2013.01)

(58) Field of Classification Search
CPC ....... G06K 7/00; G06K 7/0004; G06K 19/08; G06K 7/10257; G06K 7/10297
USPC ............... 235/385, 435, 492; 340/10.1, 572.1
See application file for complete search history.

(56) References Cited

U.S. PATENT DOCUMENTS

| | | | |
|---|---|---|---|
| 2008/0088460 A1 * | 4/2008 | Copeland ................. | 340/572.7 |
| 2008/0210762 A1 * | 9/2008 | Osada et al. ................. | 235/492 |
| 2010/0328038 A1 * | 12/2010 | Kato ............................ | 340/10.1 |
| 2011/0195661 A1 * | 8/2011 | Miyashita ....................... | 455/39 |

* cited by examiner

*Primary Examiner* — Laura Gudorf
(74) *Attorney, Agent, or Firm* — IP Strategies

(57) ABSTRACT

An RFID/MFID system includes a tag and a reader. The tag is adapted to provide an RF identification signature when interrogated with an electric travelling wave and to provide an MF identification signature when interrogated with a magnetic travelling wave. The tag includes a target data object. The reader is adapted to read electrical and magnetic signatures of the target data object from the tag. A method of providing an identification function includes reading electrical and magnetic signatures of a target data object from tag. The tag provides an RF identification signature when interrogated with an electric travelling wave and provides an MF identification signature when interrogated with a magnetic travelling wave.

28 Claims, 4 Drawing Sheets

Encryption:

Decryption:

SMART HYBRID CARD SYSTEM PROVIDING AUTHENTICITY, PRIVACY, AND SECURITY (APS)

CROSS-REFERENCE TO RELATED APPLICATION

This is a continuation-in-part of co-pending U.S. patent application Ser. No. 12/041,357, which was filed on Mar. 3, 2008, which in turn is related to, and claims the benefit under 35 USC §119(e) of, U.S. Provisional Application for Patent No. 60/892,648, which was filed on Mar. 2, 2007.

FIELD OF THE INVENTION

The invention is related to affordable secure smart cards that provide processing capability as well as authentication, privacy, and security features.

BACKGROUND OF THE INVENTION

From an historical perspective, a better antenna, low power circuitry, and new material together made possible a miniature counter-measure against radar, namely, a fake target return with Digital Reflection Frequency Modulation (DRFM). Such a military counter-measure has found its way into commerce as a near-field communication called Radio Frequency Identification (RFID), a passive tag attached to every read-writable Smart. Hybrid Card (SHC), such as those used in passports, medical or biometric Ds, driver's licenses, and library IDs, manufactured at a fraction of the cost of and more versatile than a line-of-sight restricted bar-code optical scan system. Despite the popularity of RFID, lack of Authenticity. Privacy and Security (APS) protection provided by such systems restricts somewhat its wide-spread use in commercial, financial, medical, legal, and militarily applications. This is mainly due to a limited phase space of about $2^{32}$ to securely encrypt such light-weight devices without the code being easily broken using the sheer computing power of a modern PC, according to the NSA classification. The practical phase space is made small in part by restriction to use of the modern Latin/Roman alphabet. Further, such systems are more susceptible to successful attack due to the use of common coding terms for identification, for example, by means of statistical correlation of a category index when examining a group of RFIDs taken from an installation.

RFID tags have proven to be more versatile than traditional and/or microdot versions of barcode catalog readers using optical scan means, and thus recently have become popular because they provide inexpensive and convenient real-time read-write capabilities that are not limited to near-field, passive or active capacitive or inductive coupling, and line-of-sight operation. Integrating commercial-off-the-shelf (COTS) components, extending its use over the horizon (OTH), and APS are all enhancements that will be needed to proliferate the use of such systems into a broadened range of applications. A standard interface would also be advantageous, as confirmed by the adhoc grand unification Near-Field Communication (NFC) consortium (similar to the Blue-Tooth consortium, but larger and more aggressive). The following is a review of RFID basics and security measures, as well as a discussion of specific medical and financial applications of smart cards.

The issue of Authentication and Privacy (AP) is related to security in a somewhat lower degree on the continuum spectrum of APS. While the AP is spoken of when one wishes to ward off casual skimmers, stronger security is needed to prevent deliberate hacking. However, in general AP is taken seriously, for example, regarding issues of authentication for lawyer-client privilege and the privacy for doctor-patient communications. Thus, we need precise ownership protection for authentication checks and no third-party involvement for privacy protection. The index and content of protected data need not to be located on the same RFID tags or reader devices. Separation of such data allowed, for example. Sony to develop the Octopus Card (O-Card) in Hong Kong, circumventing the private financial data-basis sharing difficulty with the approval of charge card transactions at all metro and shop vendors, invariant and updatable data should be treated differently.

Now that 6 million livestock, cats, and dogs have been successfully tracked using RFID, the US FDA recently approved a passive RFID using a 16-digit number and including a microchip and a copper antenna that are encased in a glass capsule about the size of a grain of rice and implantable in the arm of patients at a cost about $200 per implant, including the secure Web databases for detailed information about the subscribed patients. The principle of the present invention is similar to the human structure of two passive ears with active pre-processing—only binaural agreement defines the systematic signal, otherwise in the case of disagreements, our ears consider them to be merely noise. This power-of-pairs input sensor system is biologically constrained by the isothermal equilibrium of brains characterized by the minimum of Helmholtz free energy, min. $H = E - T_o S$. Shown to be a ubiquitous unsupervised learning algorithm basis of power of pairs, blind sources separation for a single-pixel space-variant remote sensing for hearing aids, or single-pixel cancer diagnosis were solved by means of the angiogenesis-self-irradiant in terms of infrared dual color (~3-5 μm & ~8-12 μm).

What is needed is a new approach to encryption in RFID systems. For example, an affordable traditional practice used in connection with erasable tags is to obfuscate a passkey, say a private number K, by another randomized tag number T, and a reader number R; that is, T*K & R*K is stored on the tag, where * denotes an invertible operation such as EXOR. Then, only an authentic owner who knows all the elements can interrogate using an inverse operation, for example, EXOR*EXOR=I. However, such a pseudo-asymmetric RSA codec can be easily compromised by a hacker using an exhaustive frequently-used word interpretation.

It would also be advantageous to overcome security and EMI problems by providing a dual-beam, dual-port RFID reader using fractional wavelength synchronization that would allow a combination passive RFID and passive magnetic frequency identification (MFID) tag to be operated at a fraction of a wavelength out of phase.

BRIEF SUMMARY OF THE INVENTION

The present invention provides a hybrid solution utilizing simple hardware and simple software that achieve the special needs of APS, This solution provides as an advantage that a code-breaker will have to be proficient in both hardware and software methodologies even to approach success in breaching the APS of the system, That is, a casual code-breaker might have exceptional software skills but might lack hardware expertise, whereas a good RF hardware engineer might not be proficient at working with a software security codec. The degree of privacy is differentiated from security, as these attributes are neither mutually inclusive nor mutually exclusive, but can be individually determined by the specific protocol or implementation. While privacy issues center on the ability of any rogue device to read personal invariant data from a tag regardless of the meaningfulness of that data, security is the ability to ward off a hacker attack on the tags or reader. In other words, reading bits does not imply that you decipher the meaning, and secure systems are not necessarily private: however, many private systems are secure because they implement some form of access control.

Among four modalities of radar systems, for near-field applications it is possible to use an inexpensive hardware modification with two (RH & LH) orthogonal polarization-sensitive interrogator modes of a single RF reader. Then, each can read only half the data, and combining the data using an algorithm such as the Nonlinear Invertible Shuffler (NIS) Algorithm (Szu, H., M-K Hsu & Baier, P., "Authenticity & privacy image codec by nonlinear invertible shuffles," Proceeding of SPIE Vol. 6247, Orlando April 2006, incorporated herein in its entirety), the combined results can be decoded with a number of shufflers within a pseudo-real time. Such a hybrid hardware-software solution achieves authentication, privacy protection, and some quantifiable degree of security. Thus, the encoded data is distributed between two (or more) RFIDs, so that each must be read by a slightly different modality of the readers in order to combine the result into the final ID message.

Knowing radar history, the counter-measure DRFM can be countered by, instead of using one RFID tag per SC, two tags holding, so to speak, either the head or the tail portion of the ID readable by different modes of the Interrogator. A hardware-software hybrid approach is adopted. According to radar physics we can choose any one or more of the amplitude, frequency, phase, polarization, and two radiation energy supply principles, the capacitance coupling (typically ~6 m) and the inductance coupling (typically <1 m), to code the pair of tags differently. A casual skimmer equipped with a single-mode reader cannot read all. Near-field and far-field applications are considered. The near-field application is used, for example, at check-out counters or in the conveyor-belt inventory process, which process sensitive and invariant data. The far-field is used to identify an item and also to determine its location passively. If more power for long-distance propagation is used, then a triangulation using a pair of secured readers, located at known geo-locations, can interrogate and identify items or persons and their locations in a GPS-blind environment.

According to an aspect of the invention, an RFID system includes a plurality of RFID tags and an RFID reader. Each RFID tag includes a respective portion of a target data object. The RFID reader is adapted to read each portion of the target data object from the respective RFID tags. For example the plurality of RFID tags can be or include first and second RFID tags.

Assuming a system having two RFID tags, the RFID reader can be adapted to provide a received data object corresponding to the target data object based on the first and second portions of the target data object read by the RFID reader. For example, the RFID reader can be adapted to provide the received data object by performing a combination function on at least the first and second portions of the target data object read by the RHO reader. The combination function can apply, for example, a nonlinear invertible shuffler algorithm.

At least one of the first and second portions of the target data object can be stored on the respective RFID tag in encrypted form. In this case, the RFID reader can also be adapted to decrypt the first and second portions of the target data object.

The first portion of the target data object can be stored on the first RFID tag first coded form, and the second portion of the target data object can be stored on the second RFID tag in a second coded form. In this case, the RFID reader can also be adapted to read the first portion of the target data object while in a first read mode corresponding to the first coded form, and to read the second portion of the target data object while in a second mode corresponding to the second coded form. For example, the first and second portions of the target data object can be stored in mutually-orthogonal coded form, and the RFID reader can be adapted to read the first and second portions of the target data object in respective first and second orthogonal polarization-sensitive interrogator modes.

The first and second RFID tags can be disposed on a common substrate.

According to another embodiment of the RFID system, a plurality of RFID readers can be provided, each of which is adapted to read at least one portion of the target data object from the respective RFID tags. For example, each RFID reader can be adapted to read each portion of the target data object from the respective RFID tags. Alternatively, each RFID reader can be adapted to read less than all of the portions, to require combination of multiple RFID readings to acquire the target data object. For example, the plurality of RFD readers can include at least a first RFID reader and a second RFID reader. The first RFID reader can be adapted to read a first portion of the target data object from the respective RFID tags, and the second RFID reader can be adapted to read a second portion of the target data object from the respective RFID tags. The RFID system can also include a processor that is adapted to receive data corresponding to the first and second portions of the target data object from the respective RFID readers and to provide a received data object corresponding to the target data object based on the received data. The processor can be a stand-alone component, can be part of another system component, and/or can be a component of one or more of the RFID readers.

According to another aspect of the invention, a method of providing an identification function includes using an RFID reader to read one portion of a target data object stored on an RFID tag. The target data object includes a plurality of portions including the one portion.

For example, the plurality of portions can be or include first and second portions of the target data object, in which case the method also includes using an RFID reader to read a second portion of the target data object stored on a second RFID tag.

The method can also include providing a received data object corresponding to the target data object based on the first and second portions of the target data object read by the RFID reader. For example, this can include performing a combination function on at least the first and second portions of the target data object read by the RFID reader. The combination function can include, for example, applying a nonlinear invertible shuffler algorithm.

The method can also include decrypting at least decrypted components of the first and second portions of the target data object.

The method can also include reading the first portion of the target data object while in a first read mode corresponding to a first coded form of the first portion of the target data object, and reading the second portion of the target data object while in a second read mode corresponding to a second coded form of the second portion of the target data object. For example, the first and second coded forms can be mutually-orthogonal coded forms, and the method can include reading the first and second portions of the target data object in respective first and second orthogonal polarization-sensitive interrogator modes.

According to another aspect of the invention, an RFID tag includes a portion of a target data object. The target data object includes a plurality of portions.

For example, each portion of the target data object can be stored on a respective other RFID tag. According to another aspect of the invention, a plurality of RFID tags includes this RFID tag. The plurality of RFID tags can be disposed on a common substrate. According to another aspect of the invention, an RFID reader is adapted to read each portion of the target data object from the respective RFID tags.

The RFID reader can be adapted to provide a received data object corresponding to the target data object based on the plurality of portions of the target data object read by the RFID reader. For example, the RFID reader can be adapted to provide the received data object by performing a combination function on the plurality of portions of the target data object read by the RFID reader. The combination function can apply, for example, a nonlinear invertible shuffler algorithm.

At least one portion of the target data object can be stored on the respective RFID tag in encrypted form. The RHO reader can be adapted to decrypt the at least one of the plurality of portions of the target data object stored on the respective RFID tag.

The respective portion of the target data object can be stored on each RFID tag in a respective coded form. A first coded form of a first portion of the target data object stored on a first RFID tag of the plurality of RFID tags is different than a second coded form of a second portion of the target data object stored on a second RFID tag of the plurality of RFID tags. The RFID reader can be adapted to read the first portion of the target data object while in a first read mode corresponding to the first coded form, and further adapted to read the second portion of the target data object while in a second mode corresponding to the second coded form. For example, the first and second portions of the target data object can be stored in mutually-orthogonal coded form, and the RFID reader is adapted to read the first and second portions of the target data object in respective first and second orthogonal polarization-sensitive interrogator modes.

According to another aspect of the invention, an RFID/MFID (magnetic field identification) system includes an RFID/MFID tag and an RFID/MFID reader. The RFID/MFID tag is adapted to provide an RE identification signature when interrogated with an electric travelling wave and to provide an MF identification signature when interrogated with a magnetic travelling wave. The RFID/MFID tag includes a target data object. The REID/MFID reader is adapted to read electrical and magnetic signatures of the target data object from the RFID/MFID tag.

The RFID/MFID reader can be adapted to direct an electromagnetic travelling wave at the RFID/MFID tag. The electromagnetic travelling wave can include an electrical component and a magnetic component. For example, the electrical component and the magnetic component can be respective travelling waves that are synchronized and out of phase with respect to each other.

The RFID/MFID reader can be further adapted to provide a received data object corresponding to the target data object based on the electrical and magnetic signatures of the target data object read by the RFID/MFID reader.

The RFID/MFID tag can include an RC circuit and a magnetic field coil. The RC circuit and the magnetic field coil can be adapted to store energies of the electrical component and the magnetic component, respectively, of the electromagnetic travelling wave. The RC circuit and the magnetic field coil can be adapted to echo the stored energies of the electrical component and the magnetic component, respectively, when the respective stored energies of the electrical component and the magnetic component reach predetermined thresholds. The RFID/MFID tag can include a power source to amplify at least one of the echoes. The RFID/MFID reader can be adapted to read the echoes of the stored energies of the electrical component and the magnetic component the respective electrical and magnetic signatures of the target data object. The RFID/MFID reader can be adapted to correct for a phase difference of the electrical and magnetic signatures of the target data object.

The RFID/MFID reader can be adapted to read the respective echoes of the stored energy of the electric component and the magnetic component, and the RFID/MFID reader can be adapted to determine that one or the other echo represents the received data object.

The RFID/MFID reader can be adapted to read the echo of the stored energy of the electric component, the echo of the stored energy of the magnetic component, and a beat signal produced by the difference in phase of the echoes. The RFID/MFID reader can include a processing component that is adapted to determine the received data object based on the echo of the stored energy of the electric component, the echo of the stored energy of the magnetic component, and the beat signal. The processing component can be adapted to determine the received data object by performing a three-dimensional look-up based on the echo of the stored energy of the electric component, the echo of the stored energy of the magnetic component, and the beat signal. Alternatively, the processing component can be adapted to determine the received data object by applying a nonlinear invertible shuffler algorithm to the echo of the stored energy of the electric component and/or the echo of the stored energy of the magnetic component.

According to another aspect of the invention, a method of providing an identification function includes reading electrical and magnetic signatures of a target data object from an RFID/MFID tag. The RFID/MFID tag provides an RF identification signature when interrogated with an electric travelling wave and provides an MF identification signature when interrogated with a magnetic travelling wave.

The method can also include directing an electromagnetic travelling wave at the RFID/MFID tag. The electromagnetic travelling wave can include an electrical component and a magnetic component. The electrical component and the magnetic component can be respective travelling waves that are synchronized and out of phase with respect to each other.

The method can also include providing a received data object corresponding to the target data object based on the read electrical and magnetic signatures of the target data object.

The method can also include providing the RFID/MFID tag with an RC circuit and a magnetic field coil. In this case, energies of the electrical component and the magnetic component of the electromagnetic travelling wave can be stored at the RC circuit and the magnetic field coil, respectively. The stored energies of the electrical component and the magnetic component can be echoed when the respective stored energies of the electrical component and the magnetic component reach predetermined thresholds. The method can also include providing the RFID/MFID tag with a power source to amplify at least one of the echoes. The echoes of the stored energies of the electrical component and the magnetic component can be read as the respective electrical and magnetic signatures of the target data object.

A phase difference of the electrical and magnetic signatures of the target data object can be corrected.

The method can also include reading the respective echoes of the stored energy of the electric component and the magnetic component, and determining that one or the other echo represents the received data object.

The method can also include reading the echo of the stored energy of the electric component, the echo of the stored energy of the magnetic component, and a beat signal produced by the difference in phase of the echoes. The received data object can be determined based on the echo of the stored energy of the electric component, the echo of the stored energy of the magnetic component, and the beat signal. For example, the received data object can be determined by performing a three-dimensional look-up based on the echo of the stored energy of the electric component, the echo of the stored energy of the magnetic component, and the beat signal. Alternatively, the received data object can be determined by applying a nonlinear invertible shuffler algorithm to the at least one of the echo of the stored energy of the electric component and the echo of the stored energy of the magnetic component.

Thus, the present invention provides enhanced hardware and software security. for an identification process.

DETAILED DESCRIPTION OF THE INVENTION

Physics of Passive RFID/SC

Radar was originally developed for target range and velocity determination using weighted frequency correlation in the echo delay and Doppler-shifted frequency shifts, similar to the whistling sound identification of a moving train. However, radar actively sends the probing wave and listens to the echo. Radar soon became a popular navigational and military deployment tool world-wide.

Consequently, adversaries began to develop counter-measures against radar detection, such as using retro-reflection clutter with artificial Reflection Frequency Modulation (RFM) to modify the echo wave with a fake Doppler shift frequency. A modern digital version of this technique is called DRFM. While the schematic for the RFD operation principle is fairly straightforward, modern innovations have provided less expensive, faster, smaller-scale implementations.

Figure 1:
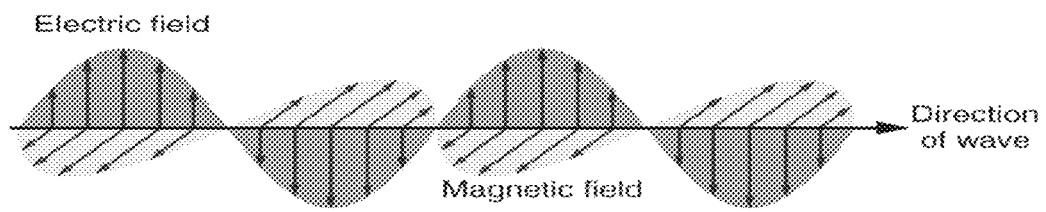
FIG. 1 is a radar diagram of a typical DRFM traveling electromagnetic wave.
Figure 2:
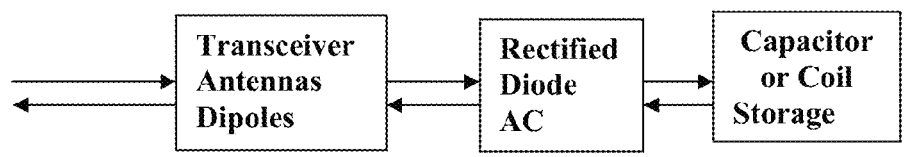
FIG. 2 is a block diagram of a typical transceiver/storage circuit for an RFID tag.

The electric power for radiation of a passive RFID/SC comes from the impingent electromagnetic interrogation train applied to the tag. As shown in FIGS. 1 and 2, the traveling electromagnetic wave includes electric field and magnetic field components, which are received at transceiver antenna dipoles. The signal is rectified, and the energy is stored, such as by using a capacitor or cod storage. The energy in such a passive RFID/SC device does not store in a battery because of low efficiency, although in the future, high efficiency storage means such as a nano-battery equipped with remote charging will be used. Current simple RFID/SC systems merely rectify the incoming reading wave to temporarily store the electrical power in the capacitor charges or magnetic coil fluxes; passively bounces back when exceeding a threshold with some coded modulation, to be read as the identification of the RFID/SC tag.

Both means of temporal storage require first rectifying the alternating electromagnetic waves into direct positive modulations in order to induce net accumulative charges in the capacitor or a consistently directional magnetic flux line in the inductor coil. Conservation of energy takes a serious discount, sometimes with more than 50% of the waste becoming thermal noise. Furthermore, the receiver and transmission antennas sometimes suffer due to the limited size of the device, causing a tuning impedance mismatch.

Let the incident reader power be $P_r$ and emitter tag power $P_t$. According to propagation law, we have the following formulas for round-trip power in both cases:

$$\text{Inductance Coil Coupling: } P_t = P_r M \eta \eta \gamma / C_o (1/r^3)(1/r^3) \quad (1)$$

$$\text{Capacitance Charge Coupling: } P_t = P_r Q \eta \eta \gamma (1/r^2)(1/r^2) \quad (2)$$

Where Q represents the net charge limited by the material property of RFID/SC for the electrical coupling and $\gamma$ is the coupling efficiency, the magnetic moment M and $\gamma/C_o$ magnetic coupling efficiency divided by the speed of light $C_o$. Similar to bi-static radar involving two antennas, we assumed both transceiver antennas have a similar efficiency denoted by $\eta$. It is obvious that a magnetic reader damps according to induced-dipole Vander Waal's force law $(1/r^6)$ and the capacitor reader is similar to the mono-static radar range equation $(1/r^4)$. Recent advance in CAD, antenna design, and circuit miniaturization techniques and the discovery of efficient storage materials allow one to produce RFID tags at a modest cost. This is a remarkable example of technology transfer from DoD to the commercial sector, after decades of military investment.

Because smart cards and RFID have no standardization, the following is presented as only a cursory summary of exemplary requirements for an RFID passport:

13.56 MHz,

Passport will contain PKI-encrypted data for verification.

ICAO (U.N. air transportation governing organization) has a large list of security mechanisms that are optional.

The baseline implementation has no access control mechanism and will allow anyone to uniquely identify individual passports.

Passport physical security: eddy currents, ferrite, and tinfoil hats.

With capacitance RFID (EPC 900 MHz, etc.), preventing a transponder from transmitting would be as simple as surrounding it with a conducting surface or conducting mesh with holes much smaller than the wavelength.

Conductive materials, when surrounding an object, create a "Faraday cage," effectively stopping any part of the electric field from powering up the given transponder.

Inductive RFID (13.56 MHz), the kind used n passports, a magnetic field to power itself, not the electric field.

A static (DC) magnetic field is unaffected by a conductor (specifically in the binding of the passport).

As the alternation frequency of the magnetic field increases, eddy currents form in the conductor, creating local opposing magnetic fields to the global magnetic field, effectively canceling the net field seen by the tag.

This is the same phenomenon that makes generators work: any conductor opposes a change in magnetic flux by creating a current that induces flux opposite the direction of change.

It's easy to create a conductor around an RFID transponder to render it useless, but much more difficult to make it work only when read from specific direction.

(A) Inductive Coupling Magnetic Field) RFID, at 13.56 MHz, 134.2 KHz, uses near-field coupling. In the near field, the signal is basically an alternating magnetic field. Near-field received power drops as $r^{-6}$, relatively safe with regard to direct over-the-air sniffing. The Department of Homeland Security has reported ~10 feet maximum range in sniffing HF RFID. Possible disturbances in far-field radiation due to near-field modulation may be possible to sniff HF RFID from far away. Inductive coupling is like a free-air transformer, with the tag's contribution to the mutual inductance being varied in order to transmit data back to the reader.

The range of a given inductive RFID system is relative to its ability to propagate magnetic field lines to the tag. There are many clever techniques for changing magnetic field patterns such as antenna size, antenna composition, etc. Power is important, but antenna design/implementation is more so. There are physical limits to range gained by feats of engineering and massive amounts of power. View the magnetic field lines as conservative, oscillating back and forth to the maximum distance of the near field. At a given frequency of oscillation, the further the field lines travel in a given period, the faster they have to travel. Thus, the maximum theoretical range of the near field alternating magnetic field is limited by the speed of light, $3 \times 10^8$ m/sec. For our purposes, the near field ends at $\lambda/2\pi = 3.5$ meters at 13.56 MHz. When coupled with the minimum power needed to energize a tag, the effective range of HF RFID becomes much shorter under realistic power limitations.

(B) Capacitive Coupling (Electric Field) RFID, ~900 MHz or 2.4 GHz, 900 MHz, is not precise because of regulatory limitations. Power drops in one way as $r^{-2}$. The tag transfers data through "backscatter," altering its radar cross-section to modulate a signal. A realistic range limiting factor is not the signal-to-noise ratio (SNR) of the demodulation circuitry, but rather power supplied to the tag. With a larger SNR than required, sniffing can take place further than the maximum read range.

Long-range UHF RHO demonstrations have been given. As a byproduct of radar engineering, high gain, directional antennas are possible and exist for both Tx and Rx. The key element is radiative impedance matching, where DC impedance matching dependant on antenna detection method is used, and then a Tx antenna retrofit is made for performing UHF RFID. UHF RFID direction of sight is a continuous electromagnetic wave of which the frequency modulation is set at 7000 Hz. This system uses frequency shift keying (FSK), so the center frequency can be hit, as can either of the sub-carriers to disrupt a proper reading.

Commercial devices currently have a range of about 6 meters for capacitance coupling. None except DRFM can function with long-range passive GPS applications yet, because of the intrinsic limitation of size, power, and weight of a passive RFID/SC device. This application will be discussed again below. Of course, theoretically speaking, one can exploit longer wavelength interrogation and/or an internal battery-like storage, but it will then not be a real-time bounced-back interrogation, Even if someone succeeds in performing a remote charging of a battery, of which the efficiency is further cut down by battery energy conversion at ~15%, then passive RFID/SC becomes similar to active RFID/SC installed at toll booths for bridges and roads.

(C) Commercial Test bed: Hong Kong Octopus Cards by Sony FeliCa, Octopus Cards (OC) have become popular distributed-payment smart cards for taxis, buses, restaurants, subways, apartment complex access, etc. in Hong Kong. OC is a more sophisticated system than, for example, the Washington D.C. Metro subway fare card, which is merely erasable magnetic storage. Readers of OC can be offline. Utilizing a store and forward mechanism that validates small transactions using PKI, OC does not perform an exact balance check until synced with an online system. Other readers having offline authentication can use PKI for online balance checks. It deliberately eliminates the need to share a secret or have database access among all system devices.

RFID Light Security Algorithms

Practicality, tag cost, size, and power requirements are inversely proportional to better security and privacy. Applications only implement adequate, rather than ideal security. Possibility vs. Feasibility: simply because the equipment is expensive today doesn't mean that it will continue to be out of reach tomorrow. Don't make security decisions based on data obscurity. Work-around does not make the protocol itself more secure, but can maximize the security of a given application. Dynamic Recoding: Each tag read rewrites part of a tag's user data. It requires online readers to detect if cloning has occurred. RFID Odometer: performed by the tag manufacturer, incredibly effective fraud mitigation. Passkey protected validation data: Easy implementation in production tags. Does not increase privacy, but does increase security significantly if used with online readers and variable passkeys.

Texas Instruments DST has a symmetric key architecture or a shared secret key, implemented as a 40-bit iterative cipher on a shared secret key to authenticate its user identification. It has a publicly-available unique identification with no privacy consideration. A weak, proprietary algorithm was invented and used in the early 1990s. Using pre-selected challenges one can ascertain the key via brute force or via a time-memory tradeoff table within minutes (offline attack). Privacy is a problem if the tag issues unique invariant information to any reader. The tag validates a readers public key (using pre-stored criteria) and encrypts data with that reader's public key.

It is clear that RFID requires authentication, privacy and security considerations. Authoritative tag identification is perhaps the most important factor in RFID security. Privacy is an issue if any unique invariant personal information is publicly readable. Common tactics of obfuscation of the passkey is summa zed as follows:

(1) Authentication:

A cleverly embedded private key K is usually 80 bits in turns of the public tag key T and public reader key R only to authenticate the legitimate reader, who knows T, R, & K. Therefore, he or she can read the tag by means of an idempotent inverse operation, such as the EXOR operation denoted by superscript *, namely:

$$T^*(T^*K) = K; \quad (3)$$

$$R^*(R^*K) = K \quad (4)$$

whereas another person can only read the pseudo-asymmetric reader (R*K) and tag (T*K) which do not appear to be the symmetric key K.

A typical RFID tag device is, for example, made of a Parallax 54 mm×85 mm card with a tag in it operating at 170 kHz radiofrequency. Usually a 160-bit ASCII data string will pass to the reader with name etc. from a database PC. If more information is needed, then a multiple of 160 bits can code the biometric data, including, for example, a VGA RGB digital photo picture of 640×480 pixels of the owner and other pertinent application or transaction data.

(2) Privacy Protection at Check Out (A) Library Permanent book. Tag $T_i$ for the i-th book: A randomly selected N is used to encrypt the time and borrower defined as a temporary tag $T_i'=T_i*N$ for each book borrowed, where N=N(time, borrower) is a lookup table. The privacy protection is due to the only library record (book item, time & borrower) in terms of $(T_i, T_i')$. Thus, "who has borrowed what" was hidden in $(T_i, T_i')$, in contrast to usual library record: $(T_i$, date & Mr. Smith). When the book is returned (with or without using Mr. Smith's ID number), the library computer can apply the permanent book tag read off the RFID to invert the temporary tag $T_i'$ to find the encrypted ID of the borrower by the following inversion:

$$T_i*T_i'=T_i*(T_i*N)=N=N(\text{time, borrower})$$

and thereby the librarian can cancel the borrower record in the library computer. Books need no privacy, but people do. The question that one wants to avoid having the library data basis reveal is Mr. Smith's reading habits, which could be easily deduced from the data basis of $(T_i, T_i')$. However, the inverse question of what books has Mr. Smith borrowed in the past, requires knowing ahead of time the book name tag T so that one can vary it by the data basis $(T_i,T_i')$.

(B) Credit Card based on a Smart Card (SC): A consumer can read all purchase banking transactions in real-time as opposed to the usual credit card monthly bill. Privacy and security protection is crucial for the adoption of such an SC. This might be implemented because only the card owner who has purchased the products has the material goods with his/her RFID $T_i$ in hand. The cashier at the RHO item checkout should record a coded item RFID convolved with its approval banking information etc, in $N_i$, in coded item RFID $T_i'=(T_i, *N_i,)$. As a result, only the consumer who owns the real RFID tag T can legitimately interrogate the smart card for the detailed banking transaction balance sensitive information $N_i$ by the following inverse operation:

$$T_i*T_i'=T_i*(T_i*N_i)=N_i=N_i \text{ (transaction, banking information, time, Vendor ID)}$$

No skimmer in principle has the goods or products in hand in order to interrogate the banking transaction and other private information coded within by the security telebanking system and recorded in the SC. This number is assigned to be his or her alone only for this item, which will be convolved with his or her original fixed book tag T such as T'=T*N.

Obviously, any variation of such a traditional light security algorithmic approach can be deciphered by an attacker's supercomputing.

(3) Real-World Practical Experience Itemized in the Following Non-Limiting Examples:
1. A Near Field Communication (NFC) Consortium could provide a framework to formulate a commercialization standard similar to the Blue Tooth standard, for the authentication of uniqueness, privacy of no-third party, and light-weight security within resource-constrained environments, in conformity with the Data Encryption Standard (DES adopted in 1977 56 bits key length as Federal Information Processing Standard FIPS 46), which can broaden the application domains and enhance consumer confidence.
2. RFID is neither categorically secure nor insecure. It is highly implementation dependant.
3. Most RFID standards provide room for interpretation because of the varying demands of the technology. There is no turnkey solution. One vendor's system may be more secure than another's.
4. Security is a factor of authentication, and vice versa.
5. All passkeys, whether symmetric key or asymmetric key, require encryption for wireless transport to prevent sniffing.
6. It is harder to sniff traffic on the tag-to-reader channel because lower power transmission does not propagate as far.
7. Safe implementations of kill-coding require on-line readers and tag-specific passkeys. There will be problems if non-trusted devices/vendors or offline readers need to access to kill codes.
8. Retailers e using kill codes to protect privacy of customer at checkout,
9. Kill-code databasing adds to the cost and time to checkout.
10. Possible single kill-code for entire RFID deployment.
11. Authority by means of Passkeys.
12. Privacy is a problem if there is no access control to any unique or invariant data stored on the tag.
13. Typically implemented on read-only and read-write tags to limit access to specific portions of memory and allow access to specific commands.
14. Safe implementations of passkey authentication require on-line readers and tag-specific passkeys.
15. Multi-factor authentication can help prevent "superficial" cloning done by regular users.
16. Store tag specifications (TID data) as an identification parameter.
17. Tags are referenced by 16-bit pseudo-random handles generated during interrogation.
18. Passkeys are 32-bit (P0-P31). Current handle is designated as H0.
19. Reader sends (P0-P15) XOR (H0) to tag.
20. Tag generates new 16-bit pseudo-rand H1, sends to reader.
21. Reader sends (P16-P31) XOR (H1) to tag.
22. Tag confirms authentication, reader uses H1 as handle to communicate with tag.
23. Passkey transports not in plain text, but the handles are transmitted in plaintext on the reader-to-tag channel on initial tag interrogation (for H0) and for subsequent transactions (for H1).
24. Reader-to-tag channel is more powerful, more conducive to sniffing.
25. Memory can be written to without a pass code if it is not locked, but, if looked requires a pass-code.
26. In order to change lock status, a pass-code is always required. Also, lock status can be locked making a read-only tag.
27. Many users will simply lock their tags, but not lock the lock of them, creating vulnerability if weak pass codes are used.

Privacy will be a problem if there is unique invariant data available to readers without any sort of authoritative reader requirement. Symmetric key encryption relies on a "shared secret" between the tag and the reader so that tag authority can be established to the reader. If a challenge-response system is used, a correct tag response to the reader's challenge ensures tag authority. Like a passkey, safe implementation requires on-line readers with tag-specific passkeys. Similar problems exist with respect to the passkey if non-trusted devices/vendors need to read tag data/functions. Transport data is encrypted, but may be analyzed to determine a shared secret.

Comparing the security and complexity of cryptographic algorithms is a very difficult task, mainly because it is hard to define "security" and "complexity" in a manner that is precise, reasonable, and practical.

(4) How do we Measure the Degree of Security?

As a working definition, we assume here that the security of an algorithm is determined by its key length, while its complexity is measured by the time it takes to process a fixed amount of data on a given platform. The reasoning here is that cryptographic algorithms (except public key algorithms) are considered "broken" if the cryptanalysis as a method of decryption whose expected running time is less than the expected running time of an exhaustive key search. Hence, as long as we exclude algorithms that have been broken, the key length should be a valid measure of security. In order to find an n-bit key, we should expect to require $2^{n-1}$ operations (trial encryptions), on average. Moreover, it seems appropriate to measure complexity experimentally by counting clock cycles of sample implementations. We can never prove that an exhaustive key search is truly the most efficient way of breaking a given cipher. At best, we can hope that an algorithm is studied independently by many cryptanalysts and no weaknesses are found. Performance typically depends on the hardware used and the implementation of an algorithm. For example, Serpent was the slowest of the AES finalists when implemented in software (on a personal computer), but was fastest in hardware (on an FPGA). Hardware and software speeds often depend on the amount of parallelism possible and the necessary chip area. Key length is only an indirect measure of security, even if we consider algorithms of comparable "complexity." For example, among the five AES finalists, two have the most time-consuming key setup, resulting in a large overhead or pre-computation. This has little bearing on the resulting performance because it needs to be done only once for each key, but it may considerably slow an exhaustive key search where it needs to be done for every trial encryption. Exhaustive key searches can always be parallelized, which could reduce the time an attacker needs to perform the search.

Using key length as a measure of security does not take into account that different algorithms could have different "security margins," For example, cryptographers might increase the number of rounds in an iterated block cipher in the hope that the algorithm will remain secure even if more powerful methods of analysis are detected. Our definition of security in terms of key length does not reflect how conservative a design is. For example, in the AES competition Serpent, which supports exactly the same key lengths as the other algorithms (128, 192, and 256 bits), was considered the "strongest" algorithm with the biggest security margin in the sense that the complexity of known methods of cryptanalysis, such as linear and differential crypt analysis, appeared to exceed the complexity of an exhaustive key search by a much wider margin than any of the other candidates.

(5) Overview of Cryptographic Algorithms

A number of cryptographic algorithms exist, including both symmetric-algorithm secret keys (TEA, SEA) and public key algorithms (NTRU), that have a small footprint and are scalable to fit onto electronic devices with resource constraints in terms of power consumption, memory, speed, and chip area.

(5a) Electronic Price Tags

Large department stores have been considering the replacement of barcodes on merchandise with RFID chips. This would enable customers to check out their shopping carts simply by passing close to an antenna that will read the information on the tags and calculate the amount due instantly, without the manual scanning of barcodes. Clearly, this is not an application that handles highly-sensitive information, and indeed, many people would argue that there is no need for data protection at all since the chip only contains a code that identifies the product selected by the customer to the scanner. Nevertheless, the new technology does introduce a data security issue: Once the entire inventory has been equipped with RFIDs, a competitor could walk though the aisles of the store with a concealed reader device and draw up a complete store inventory in very little time, perhaps even calculate statistics on how well certain items sell, etc. It might not be in the interest of the store that such information becomes available to its competitors. It is not the individual piece of data that is sensitive, as any customer can see what is on the shelves, but it is the ease of complete access to large amounts of data at virtually no cost that creates a problem. At the same time, encrypting the information on the tags with a strong algorithm like AES is not practical because such an encryption would require much more expensive technology and thereby make the system uneconomical, especially when tagging very inexpensive products. Thus, the challenge is to find a "light-weight" encryption algorithm that should require at least as much effort to break as co piling a manual inventory of the department store.

(5b) Invariant Data Such as Biometric Passports

As a matter of fact, Wal-Mart Inc., which has millions of chain stores world-wide, and has the world's most advanced supply-chain inventory system, has stopped the conversion effort of replacing contact optical bar codes with non-contact RFID codes, because they discovered that their competitors can rapidly read all daily inventory items while simply walking through a store. Current passive RFID provides only 128 binary codecs which can be easily broken by a PC in few minutes. For example, one can easily attack a traditional RFID system with a simple electric dipole antenna by comparing the largest repeated symbols representing common naming items for inventory reasons, for example, the category and the price list, etc. Once all twenty-six letters are decode, all words follow.

Further, the Vatican library has stopped its original effort to convert their artifact digitization registration from optical bar code to RFID based on similar concerns. The U.S. Library of Congress has also stopped the conversion because of privacy concerns, realizing that someone could easily determine the private reading habits of others.

In the wake of the 9/11 attacks, various countries have moved to upgrade the security of travel documents by fitting passports with wireless RFID smartcards. These are more sophisticated devices than electronic price tags in that these more expensive chips cannot only send data stored in memory, they can also perform simple data processing. Similar to the previous example, there is a security concern that criminals could exploit this technology to "skim" information off passports carried by their bearer. Hence a person's nationality, name, birthday, and perhaps even biometric data (photos and fingerprints) could be at risk from being stolen unnoticed. The challenge here is to provide encryption that is strong enough to protect these data, but at the same time to establish a protocol that will allow authorized agents (immigration officers) to access the data. Because such a protocol would need to be coordinated among many different countries, with varying levels of technical sophistication, again it seems that no satisfactory protocol has so far been proposed.

A standard feature of almost all new cars is the radio key that unlocks the car remotely. It would be very insecure to open the car using a fixed code since such a code could easily be recorded by a nearby observer, and that observer could replay the signal and thus open the car and steal its contents. Therefore, one common technique is to change the signal every time the key is used. Both the key and the central computer of the car have secret list of random codes. Every code is used only once and discarded. In order to break in to the car, an intruder would need to know the next code on the list and send it to the receiver. Because a car owner can accidentally operate the remote key while being out of reach of the car's receiver, the car will compare the received code not only to the next code on the list, but perhaps to the next 100 codes, and open the locks and reset the pointer to the match on the list if a match is found. Such radio keys operate on very low power and have very little memory. Consequently, the key cannot store a large number of codes. Instead, the codes are generated by a random number generator. This generator must have the property that an attacker cannot easily calculate the next element in the sequence, even if he knows a finite number of the preceding elements. This is a light-weight cryptographic primitive.

Figure 3:
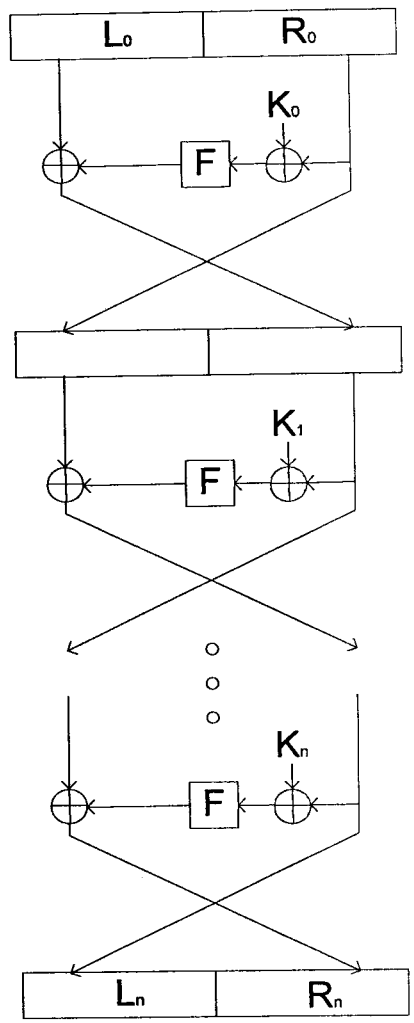
FIG. 3 is a block diagram of a preferred embodiment of a nonlinear invertible shuffler.
Figure 3:
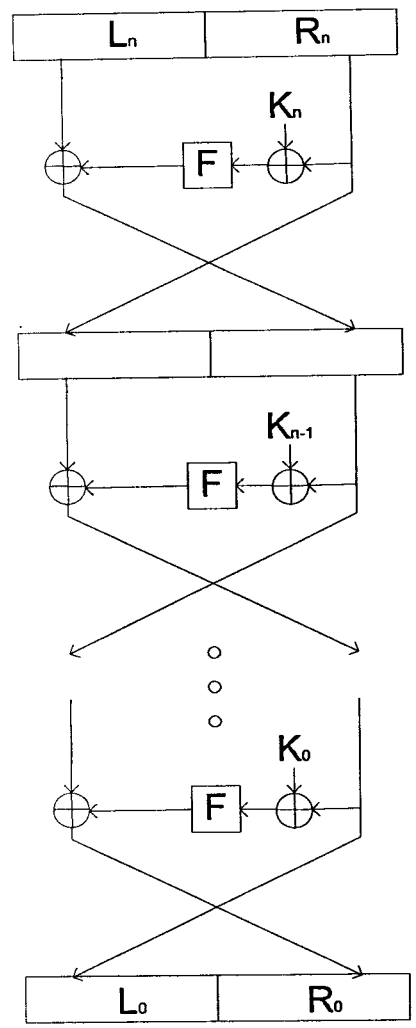

(6) Nonlinear Invertible Shuffle (NIS) Algorithm Matching Double Passive Tags for One-ID Following the Data Encryption Standard (DES) Feistel lattice structure established circa 1970 for NIST, the old Bureau of Standards, and modifying it as a shuffle of two tag numbers having a total of 64 bits or 4 bytes each ID reading, in several cycles with an invertible nonlinear idempotent operation, a preferred embodiment of a Nonlinear Invertible Shuffle can be implemented as the combiner function, as shown in FIG. 3.

The key length in MS is 8 bytes. The key is defined as follows:

$$K=(k_0 k_1 \ldots k_{63})=(k_a k_b k_c k_d)$$

The key is generated by a simple one-dimensional Logistic Chaotic Map, $K_{n+1}=4\square K_n(1-K_n)$ and an arbitrary fixed Feigenbaum knob $1>\lambda_o>3/4$, the initial value is random in the range of $\{0, \ldots, 2^{32}-1\}$ mapping to the value of $\{0, \ldots, 2^{64}-1\}$. The total number of keys possibly generated is $2^{32}-1$, which defines the exhaustive search required for software codec security alone. For calculations of $K_i$, i=1, ... n, $$K_i=(K_{ic}\oplus K_{(i-1)d}, K_{id}\oplus K_{(i-1)a}, K_{ia}\oplus K_{(i-1)b}, K_{ib}\oplus K_{(i-1)c})$$

That has a relatively small footprint and is scalable so as to achieve throughput rates that are at least as high as those of the DES finalists called AES, but can be considerably higher if a "lighter" variant of the algorithm with fewer rounds is chosen. An initial security analysis indicates that strong versions of the algorithm can achieve security comparable to the DES finalists. It is likely that faster variants should still be secure enough to resist any practical attacks based on today's computer technology. Hence, this algorithm can be used to fill the gap of light-weight applications requiring electronic protection.

Hybrid Hardware & Software Solution

Among four modalities of radar systems, for near field applications it is possible to use an inexpensive hardware modification with two (RH & LH) orthogonal polarization-sensitive interrogator modes of a single RF reader. Then, each can read only half the data, and combining the data using an algorithm such as the Nonlinear invertible Shuffler (NIS) Algorithm, the combined results can be decoded with a number of shufflers within a pseudo-real time. Such a hybrid hardware-software solution achieves authentication, privacy protection, and some quantifiable degree of security. Thus, the encoded data is distributed between two (or more) RFIDs, so that each must be read by a slightly different modality of the readers in order to combine the result into the final ID message.

The basic hardware architecture for an RFID receiver and transmitter is described below. The receiver is a direct conversion receiver, meaning that there is no IF stage.

(A) a Direct Conversion Receiver

Figure 4:
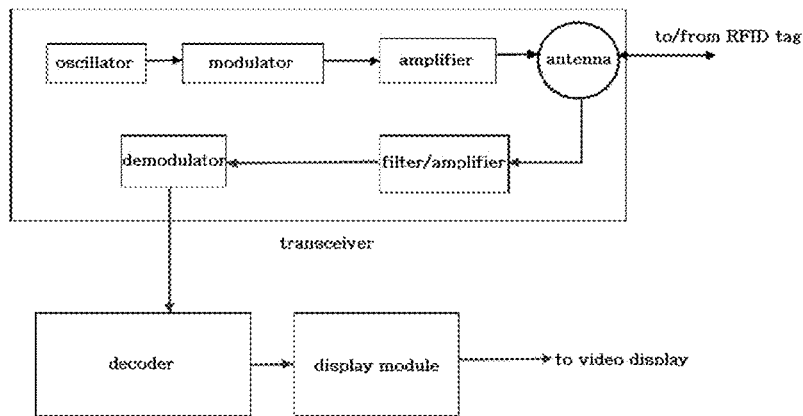
FIG. 4 is a block diagram of an exemplary embodiment of an RFID tag reader.
Figure 5:
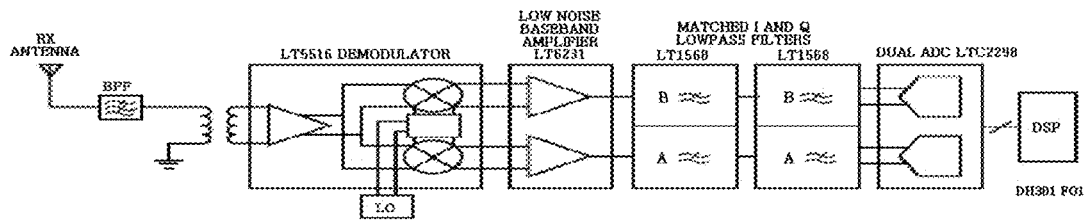
FIG. 5 is a block diagram of an exemplary direct conversion RF receiver for an RFID reader.

FIG. 4 is a block diagram of an exemplary embodiment of an RFID tag reader, and FIG. 5 is a block diagram of an exemplary direct conversion RF receiver for a reader. The receiver demodulates an RF carrier directly into a baseband signal without an intermediate frequency down-conversion (zero IF receiver). The antenna, shared by both the transmitter and receiver, detects an RF carrier and passes it through a band pass filter to an LT5516 demodulator's RF input. The LT5516 direct conversion demodulator frequency range of 800 MHz to 1.5 GHz includes the UHF range used by RFID readers (860 MHz to 960 MHz). The excellent linearity of the LT5516 provides for high sensitivity to low-level signals, even in the presence of large interfering signals.

The LT6231 low-noise dual operational amplifier acts as a differential to single-ended amplifier to drive the single-ended input of the low pass filter. Analog base band filtering is performed by the LT1568, a low-noise, precision RC filter building block. The LT1568 filter provides a simple solution for designing low pass and band pass filters with cutoff frequencies from 100 kHz to 10 MHz. These cutoff frequencies are sufficient for the 250 kHz to 4 MHz signal spectrum typically used in UHF RFID systems.

The differential output of an LT1568 drives the inputs of an LTC2298 ADC, The LTC2298 is a 65 Msps, low power (400 mW), dual 14-bit analog-to-digital converter with 74 dB signal-to-noise ratio (SNR). The digital signal processor (DSP) that follows the ADC analyzes the received signal from multiple tags and provides additional filtering.

(B) The Transmitter Architecture

Figure 6:
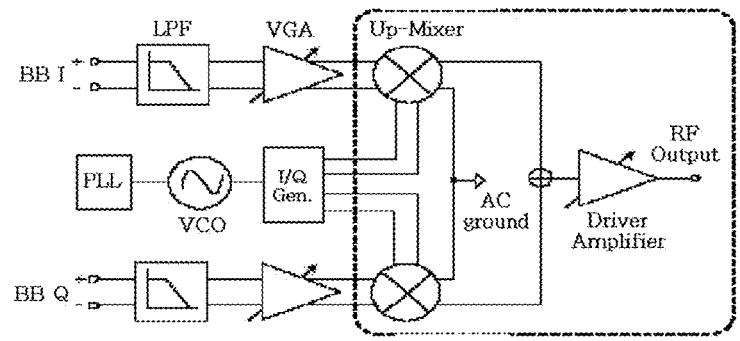
FIG. 6 is a block diagram of exemplary transmitter architecture for an RFID reader.

The transmitter first modulates the signal, then up-converts it, and transmits after enhancing signal power using a power amplifier. As shown in FIG. 6, at a first stage, the signal to be transmitted is passed through a low pass filter. These low pass filters only pass desired frequencies. The output signal from the LPF is then fed into a variable gain amplifier (VGA). The VGA amplifies the signal depending on input signal level and then feeds the signal into a mixer. The mixer used here is an up-conversion mixer, which converts the signal frequency to the desired frequency to be transmitted. The signal input is fed into the mixer from the VGA, with the second input to the mixer coming from a VCO. The VCO generates the frequency so that the output frequency of the VCO output signal and the output signal frequency from the VGA are mixed in the mixers to generate a signal to be transmitted (VCO signal+VGA signal). This signal is then fed into a power amplifier. The power amplifier is used to increase the RF output signal power, so that it can be properly transmitted.

(C) Multiple RFID Configuration

In a basic configuration of the system of the invention, an RFID system includes multiple RFID tags and an RFID reader. Each RHO tag includes a respective portion of a target data object. The RHO reader is adapted to read each portion of the target data object from the respective RFID tags. Thus, someone with a reader cannot acquire the target data object by reading just one tag, and instead must read the necessary portions from all of the tags.

For example, the plurality of RFID tags can be or include first and second RFID tags. Assuming a system having two RFID tags, the RFID reader can be adapted to provide a received data object corresponding to the target data object based on the first and second portions of the target data object read by the RFID reader. For example, the RFID reader can be adapted to read the first and second portions and to provide the received data object based on the received first and second portions. In some embodiments, the target data object can be acquired simply by appending one portion to the other, but preferably the construction of the target data object is more complex, such as by performing a combination function on at least the first and second portions of the target data object read by the RFID reader. The combination function can apply, for example, a nonlinear invertible shuffler algorithm. The result can be the target data object or other data corresponding to the target data object, such as a pointer value, a seed value, or an input to a look-up table.

At least one of the portions of the target data object can be stored on the respective RFID tag in encrypted form. In this case, the RFID reader can also be adapted to decrypt the portions of the target data object. Other possible encoding or obfuscation of the portions of the target data object is contemplated. Further, the multiple tags might include tags that carry "dummy" data, which will be ignored by the RFID reader, or control data, which will be used by the RFID reader to direct the method or particular parameters used by the reader to construct the target data object from other portions. In this way, the use of two or more tags provides many ways and combinations of ways to provide APS protection and to thwart interlopers.

When the different data portions are stored in different encoded form, the RFID reader can be adapted to read the data portions separately in different read, or they can both be read in the same mode, but decoded differently in the reader or later in a separate processing stage. Headers or other means can be used to distinguish portions read from different tags, and to control mode selection automatically. For example, the first and second portions of the target data object can be stored in mutually-orthogonal coded form, and the RFID reader can be adapted to read the first and second portions of the target data object in respective first and second orthogonal polarization-sensitive interrogator modes.

In addition to using multiple tags, other embodiments of the RFID system of the invention use multiple RFID readers as well. In some embodiments, these readers could just be duplicates of each other, and any of them could be used to, read all of the tags and therefore all of the target data object portions. In other embodiments, each reader can be adapted to read at least one portion of the target data object from the respective RFID tags, but not all of them. That is each RFID reader can be adapted to read less than all of the portions, to require combination of multiple RFID readings to acquire the target data object. Each RFID reader can be assigned a corresponding tag and portion, or each reader might be able to read more than one portion, but not all of them (for example, if there are more tags and portions than there are readers, or if overlapping groups of tags are assigned to different readers). For example, the system can include two RFID readers. The first RFID reader can be adapted to read a first portion of the target data object from the respective RFID tags, and the second RFID reader can be adapted to read a second portion of the target data object from the respective RFID tags.

The RFID system can also include a processor that is adapted to receive data corresponding to the first and second portions of the target data object from the respective RFID readers and to provide a received data object corresponding to the target data object based on the received data. The processor can be a stand-alone component, can be part of another system component, and/or can be a component of one or more of the RFID readers. For example, the readers might be adapted to acquire data from the tags but not to provide the target data object. Data received by the readers can be provided to the processor, which then provides the target data object or data corresponding to the target data object. This processor can be part of one of the readers, a central or principal reader that collects data from the other readers and provides the target data object or data corresponding to the target data object.

Figure 7:
FIG. 7 is a block diagram of an exemplary RFID system using multiple tags and readers.

FIG. 7 shows a configuration for a reader in which two RFID tags are used instead of using a single RFID tag. As previously mentioned, these tags can be fabricated on the same substrate, that is, present on the same carrier, or can be, distributed onto more than one separate carrier, to suit the particular application and APS needs. In this configuration, multiple readers can also be used, as shown. However, for ease of explanation, only a single-reader embodiment will be discussed at this point, such that both RFID tags are used with a single reader. The RDIF reader gun sends an interrogation signal to two RFID tags and receives data from both tags instead of just one. This configuration provides better security and solves some privacy issues with respect to the single RFID tag system.

The detection range of these tags typically is approximately 6 m. RFID tags open up a wide variety of applications. For example, an important problem in the health-care sector is the recognition of daily activities a home patient is engaged in. The Guide project uses small RFID readers worn by a person to identify the objects the person touches. Location context can provide important information for the interpretation of RFID readings. For example, touching a toothpaste tube has very different meanings depending on whether it happens in the storage room or in the bathroom. Freitburg University and University of Washington researchers investigated how RFID technology can be enhanced by location information. They used a mobile robot equipped with RFID antennas to determine the locations of RFD tags attached to objects in an indoor environment. The robot consists of an off-the-shelf Pioneer 2 robot equipped with a laser range scanner and equipped with RFID antennas to detect tags. GPS is a natural extension for an outdoor environment. For example, a triangulation can be computed using two tag stations with known GPS locations within the uncertainty range.

The two-tag system provides the advantages of added privacy, security, and authentication at a modest cost, as well as the convenience of miniaturization. The present invention protects no-third-party privacy, to ward off a causal attacker to provide security for sensitive information, and provides a light-weight authentication scheme. The traditional software codec approach to these concerns is limited by size, power, and weight. Thus, no embedded finite-state-machine or stand-alone PC with either the reader or the tag(s) could escape a deliberate hacker equipped with powerful supercomputing.

A desirable attribute of the next generation credit card would require instantaneous synchronization for balance checking for the convenience of customers. Then, such a smart card needs more than a technology advance but also needs to solve the real world software challenges of share secrets and provide database access between system devices, which current OC does not provide, but which is provided by the present invention.

A multiple RFID reader, or dual-port RFID, can be provided according to the invention, using joint electromagnetic waves as the orthogonal electric and magnetic inputs. While one input is taken from the energy of the RC resonant circuitry of a part of an electric dipole antenna, the other input is taken from the inductor coil for magnetic flux induction storage.

Such combined hardware is a low-cost safeguard to provide lightweight security to a passive RFID system or a battery-assisted passive RFID system. Because the reader of the item is already dual-port beyond the traditional single electrical dipole antenna approach, the sender must be likewise matched with both electric and magnetic wave components in sync. This feature provides hardware security beyond the capability of conventional RFID systems.

Moreover, the dual-port solution provides 128×128 more degrees of freedom in principle, although magnetic induction is near-field of a few meters as the electrical component has a middle range in the tens of meters. Thus, a preferred embodiment includes a battery-assisted passive RFID element to increase echo-return energy in both components to reach the interrogating reader at a distance.

The inventive operation must pass a 2-dimensional key concept with 2-dimensional key-hole pair concept, because of the right-hand rule of the Poynting vector of the travelling electrical and magnetic waves. Both components must be in sync according to the right hand rule in order to be read simultaneously by the resonant coil component and the RC circuitry-tuned electric components. In other words, the reader must simultaneously send the travelling electromagnetic wave to interrogate the matching dual-port RFID tag. Because of this, other scanning frequency RFID readers cannot match the near-field passive Dual-Port RFID or the middle-range passive battery-assisted RFID. In order to be able to rectify the AC-to-DC signal feeding the energy capacitor and stored in the magnetic coil components by Lenz induction law, both component receivers must be in sync to activate the energy storage circuitry. Otherwise, a leaky capacitor will be there to echo no electromagnetic wave backward with modulation coding information.

We assume that the double-beam probing traveling waves and EMI have electric and magnetic components of a Poynting vector, which represents the directional energy flux density of the electromagnetic field (propagating according to the conventional right-hand rule), and are each individually synchronized in phase but are not synchronized with each another.

Preferably, commercial off the shelf (COTS) passive RFID and passive MHO components are used, although custom components designed for a particular application may be used instead, Low-frequency penetrating EM waves that combine a travelling-wave electric component and a magnetic component to charge both an electrical charge capacitor and a magnetic field coil are provided for double-probing traveling electromagnetic waves having electric field and magnetic field components that are each propagating in-phase but which are a fractional wavelength out of phase with each other. The two interrogation beams are rectified separately, and the energy of each is stored. When the energy exceeds a threshold, it is echoed backward again, a fraction of a wavelength out of phase. A natural beat wave will propagate, Thus, aspects of the dual-port embodiment include:

(i) Use of two-probe electromagnetic traveling waves, where the electric and the magnetic wave components mutually differ in phase by a fractional wavelength, Both beams are received at the antenna and the magnetic coil receiver, are rectified, and charge the capacitor and the magnetic coil storage separately.

(ii) EMI cancellation occurs by elimination of all the synchronized electric and magnetic wave components.

(iii) The interrogating double beams have a deliberate delay by a fractional wavelength difference in phase.

(iv) The reader will automatic correct h phase delay and tag the energy in both the electric and the magnetic components.

(v) Because the range of magnetic components diminishes inversely at an exponential rate, it is preferable that more that one cycle of probing magnetic waves is collected, or that a battery component is included to increase the gain of the magnetic output.

(vi) The receiver processes the dual-echo returns using an E-M synchronized reader.

As noted previously, the RFID reader and MFID reader, which may otherwise be conventional hardware, will be out of the phase by a fractional wavelength to provide a combined two-dimensional, larger tensor product, space coding-decoding (codec) capability. This feature provides at least the following advantages:

(i) Hardware security: The preferably slightly out-of-sync dual traveling EM wave allows the system to rectify both separately, but only the second, delayed signal has the correct magnetic codec, before echoing back from storage after a threshold has been reached.

(ii) Software security: The phase space of the shuffler codec is much bigger, preferably at 128×128 bits, for better protection to ward off passing outsider eavesdropping via PC.

It should be apparent to those of skill in the art that the system a described above can be used in other applications, such as helping shipping companies to track cargo shipments from point to point. Another application would be to seal a cargo container using a synchronized hybrid RFID and MFID tag with fractional wavelength synchronization, in order to seal the cargo and its inspection history data to against any tampering during point-to-point transportation.

Particular exemplary embodiments of the present invention have been described in detail. These exemplary embodiments are illustrative of the inventive concept recited in the appended claims, and are not limiting of the scope or spirit of the present invention as contemplated by the inventor.

I claim:

1. A Radiofrequency Identification/Magnetic Frequency Identification (RFID/MFID) system, comprising:
    an RFID/MFID tag that is adapted to provide an RF identification signature when interrogated with an electric travelling wave and to provide an MF identification signature when interrogated with a magnetic travelling wave; and
    an RFID/MFID reader;
    wherein:
        the RFID/MFID tag includes a target data object;
        the RFID/MFID reader is adapted to read electrical and magnetic signatures of the target data object from the RFID/MFID tag;
        the RFID/MFID reader is adapted to direct an electromagnetic travelling wave at the RFID/MFID tag;
        the electromagnetic travelling wave includes an electrical component and a magnetic component;
        the RFID/MFID tag includes an RC circuit and a magnetic field coil;
        the RC circuit and the magnetic field coil are adapted to store energies of the electrical component and the magnetic component, respectively, of the electromagnetic travelling wave;
        the RC circuit and the magnetic field coil are adapted to echo the stored energies of the electrical component and the magnetic component, respectively, when the respective stored energies of the electrical component and the magnetic component reach predetermined thresholds;
        the RFID/MFID reader is adapted to read the echoes of the stored energies of the electrical component and the magnetic component as the respective electrical and magnetic signatures of the target data object; and the RFID/MFID reader is adapted to correct for a phase difference of the electrical and magnetic signatures of the target data object.

2. The RFID/MFID system of claim 1, wherein the electrical component and the magnetic component are respective travelling waves that are synchronized and out of phase with respect to each other.

3. The RFID/MFID system of claim 1, wherein the RFID/MFID reader is further adapted to provide a received data object corresponding to the target data object based on the electrical and magnetic signatures of the target data object read by the RFID/MFID reader.

4. The RFID/MFID system of claim 1, wherein the RFID/MFID tag includes a power source to amplify at least one of the echoes.

5. The RFID/MFID system of claim 1, wherein the RFID/MFID reader is adapted to read the respective echoes of the stored energy of the electric component and the magnetic component, and the RFID/MFID reader is adapted to determine that one or the other echo represents the received data object.

6. A Radiofrequency Identification/Magnetic Frequency Identification (RFID/MFID) system, comprising:
  an RFID/MFID tag that is adapted to provide an RF identification signature when interrogated with an electric travelling wave and to provide an MF identification signature when interrogated with a magnetic travelling wave; and
  an RFID/MFID reader;
  wherein:
    the RFID/MFID tag includes a target data object;
    the RFID/MFID reader is adapted to read electrical and magnetic signatures of the target data object from the RFID/MFID tag;
    the RFID/MFID reader is adapted to direct an electromagnetic travelling wave at the RFID/MFID tag;
    the electromagnetic travelling wave includes an electrical component and a magnetic component;
    the RFID/MFID tag includes an RC circuit and a magnetic field coil;
    the RC circuit and the magnetic field coil are adapted to store energies of the electrical component and the magnetic component, respectively, of the electromagnetic travelling wave;
    the RC circuit and the magnetic field coil are adapted to echo the stored energies of the electrical component and the magnetic component, respectively, when the respective stored energies of the electrical component and the magnetic component reach predetermined thresholds;
    the RFID/MFID reader is adapted to read the echoes of the stored energies of the electrical component and the magnetic component as the respective electrical and magnetic signatures of the target data object; and
    the RFID/MFID reader is adapted to read the echo of the stored energy of the electric component, the echo of the stored energy of the magnetic component, and a beat signal produced by the difference in phase of the echoes.

7. The RFID/MFID system of claim 6, wherein the RFID/MFID reader includes a processing component that is adapted to determine the received data object based on the echo of the stored energy of the electric component, the echo of the stored energy of the magnetic component, and the beat signal.

8. The RFID/MFID system of claim 7, wherein the processing component is adapted to determine the received data object by performing a three-dimensional look-up based on the echo of the stored energy of the electric component, the echo of the stored energy of the magnetic component, and the beat signal.

9. The RFID/MFID system of claim 7, wherein the processing component is adapted to determine the received data object by applying a nonlinear invertible shuffler algorithm to the at least one of the echo of the stored energy of the electric component and the echo of the stored energy of the magnetic component.

10. The RFID/MFID system of claim 6, wherein the electrical component and the magnetic component are respective travelling waves that are synchronized and out of phase with respect to each other.

11. The RFID/MFID system of claim 6, wherein the RFID/MFID reader is further adapted to provide a received data object corresponding to the target data object based on the electrical and magnetic signatures of the target data object read by the RFID/MFID reader.

12. The RFID/MFID system of claim 6, wherein the RFID/MFID tag includes power source to amplify at least one of the echoes.

13. The RFID/MFID system of claim 6, wherein the RFID/MFID reader is adapted to correct for a phase difference of the electrical and magnetic signatures of the target data object.

14. The RFID/MFID system of claim 6, wherein the RFID/MFID reader is adapted to read the respective echoes of the stored energy of the electric component and the magnetic component, and the RFID/MFID reader is adapted to determine that one or the other echo represents the received data object.

15. A method of providing an identification function, comprising:
  reading electrical and magnetic signatures of a target data object from a Radiofrequency Identification/Magnetic Frequency Identification (RFID/MFID) tag, wherein the RFID/MFID tag provides an RF identification signature when interrogated with an electric travelling wave and provides an MF identification signature when interrogated with a magnetic travelling wave;
  directing an electromagnetic travelling wave at the RFID/MFID tag, wherein the electromagnetic travelling wave includes an electrical component and a magnetic component;
  providing the RFID/MFID tag with an RC circuit and a magnetic field coil;
  storing energies of the electrical component and the magnetic component of the electromagnetic travelling wave at the RC circuit and the magnetic field coil, respectively;
  echoing the stored energies of the electrical component and the magnetic component when the respective stored energies of the electrical component and the magnetic component reach predetermined thresholds;
  reading the echoes of the stored energies of the electrical component and the magnetic component as the respective electrical and magnetic signatures of the target data object; and
  correcting for a phase difference of the electrical and magnetic signatures of the target data object.

16. The method of claim 15, wherein the electrical component and the magnetic component are respective travelling waves that are synchronized and out of phase with respect to each other.

17. The method of claim 15, further comprising providing a received data object corresponding to the target data object based on the read electrical and magnetic signatures of the target data object.

18. The method of claim 15, further comprising providing the RFID/MFID tag with a power source to amplify at least one of the echoes.

19. The method system of claim 15, further comprising reading the respective echoes of the stored energy of the electric component and the magnetic component, and determining that one or the other echo represents the received data object.

20. A method of providing an identification function, comprising:
   reading electrical and magnetic signatures of a target data object from a Radiofrequency Identification/Magnetic Frequency Identification (RFID/MFID) tag, wherein the RFID/MFID tag provides an RF identification signature when interrogated with an electric travelling wave and provides an MF identification signature when interrogated with a magnetic travelling wave;
   directing an electromagnetic travelling wave at the RFID/MFID tag, wherein the electromagnetic travelling wave includes an electrical component and a magnetic component;
   providing the RFID/MFID tag with an RC circuit and a magnetic field coil;
   storing energies of the electrical component and the magnetic component of the electromagnetic travelling wave at the RC circuit and the magnetic field coil, respectively;
   echoing the stored energies of the electrical component and the magnetic component when the respective stored energies of the electrical component and the magnetic component reach predetermined thresholds;
   reading the echoes of the stored energies of the electrical component and the magnetic component as the respective electrical and magnetic signatures of the target data object; and
   reading the echo of the stored energy of the electric component, the echo of the stored energy of the magnetic component, and a beat signal produced by the difference in phase of the echoes.

21. The method of claim 20, further comprising determining the received data object based on the echo of the stored energy of the electric component, the echo of the stored energy of the magnetic component, and the beat signal.

22. The method of claim 21, further comprising determining the received data object by performing a three-dimensional look-up based on the echo of the stored energy of the electric component, the echo of the stored energy of the magnetic component, and the beat signal.

23. The method of claim 21, further comprising determining the received data object by applying a nonlinear invertible shuffler algorithm to the at least one of the echo of the stored energy of the electric component and the echo of the stored energy of the magnetic component.

24. The method of claim 20, wherein the electrical component and the magnetic component are respective travelling waves that are synchronized and out of phase with respect to each other.

25. The method of claim 20, further comprising providing a received data object corresponding to the target data object based on the read electrical and magnetic signatures of the target data object.

26. The method of claim 20, further comprising providing the RFID/MFID tag with a power source to amplify at least one of the echoes.

27. The method of claim 20, further comprising-correcting for a phase difference of the electrical and magnetic signatures of the target data object.

28. The method system of claim 20, further comprising reading the respective echoes of the stored energy of the electric component and the magnetic component, and determining that one or the other echo represents the received data object.

* * * * *